United States Patent
Park et al.

(10) Patent No.: US 12,210,788 B2
(45) Date of Patent: Jan. 28, 2025

(54) ELECTRONIC DEVICE AND METHOD FOR VIDEO CALL BASED ON REACTION SERVICE

(71) Applicant: SAMSUNG ELECTRONICS CO., LTD., Suwon-si (KR)

(72) Inventors: Woonghee Park, Suwon-si (KR); Heekyung Moon, Suwon-si (KR); Yunsung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 94 days.

(21) Appl. No.: 17/948,998

(22) Filed: Sep. 20, 2022

(65) Prior Publication Data

US 2023/0012919 A1    Jan. 19, 2023

Related U.S. Application Data

(63) Continuation of application No. PCT/KR2022/007217, filed on May 20, 2022.

(30) Foreign Application Priority Data

May 21, 2021   (KR) .......................... 10-2021-0065685

(51) Int. Cl.
*G06F 3/14*    (2006.01)
*G06F 3/01*    (2006.01)
(Continued)

(52) U.S. Cl.
CPC ............... *G06F 3/14* (2013.01); *G06F 3/012* (2013.01); *G06F 3/16* (2013.01); *G06V 40/172* (2022.01);
(Continued)

(58) Field of Classification Search
CPC .. G06F 3/14; G06F 3/012; G06F 3/16; G06V 40/174
See application file for complete search history.

(56) References Cited

U.S. PATENT DOCUMENTS 10,496,947 B1   12/2019  Shaburov et al.
10,719,696 B2    7/2020  Wang et al.
(Continued)

FOREIGN PATENT DOCUMENTS

JP    2019-101691    6/2019
JP    6730843        7/2020
(Continued)

OTHER PUBLICATIONS

International Search Report for PCT/KR2022/007217 dated Aug. 25, 2022, 3 pages.
(Continued)

*Primary Examiner* — Olisa Anwah
(74) *Attorney, Agent, or Firm* — NIXON & VANDERHYE P.C.

(57) ABSTRACT

According to various embodiments, the an electronic device includes: a communication module comprising communication circuitry, a camera, a display, and a processor, wherein the processor is configured to control the electronic device to: make a video call connection with at least one counterpart device through the communication module, analyze user emotion\ based on a user face recognized in an image acquired from the camera in response to an utterance of a speaker of the at least one counterpart device, and display a reaction induction object inducing a suitable reaction according to user emotion varying in response to the utterance of the speaker on the display.

17 Claims, 11 Drawing Sheets

(51) Int. Cl.
*G06F 3/16* (2006.01)
*G06V 40/16* (2022.01)

(52) U.S. Cl.
CPC ...... *G06V 40/174* (2022.01); *G06F 2203/011* (2013.01)

(56) References Cited

U.S. PATENT DOCUMENTS

| | | | |
|---|---|---|---|
| 11,240,469 B1* | 2/2022 | Schoenborn | H04R 1/403 |
| 2011/0134026 A1 | 6/2011 | Kang et al. | |
| 2012/0249719 A1* | 10/2012 | Lemmey | H04M 3/567 |
| | | | 348/14.01 |
| 2014/0125757 A1 | 5/2014 | Lee et al. | |
| 2017/0243055 A1 | 8/2017 | Naveh | |
| 2018/0160055 A1 | 6/2018 | Taine et al. | |
| 2018/0295158 A1* | 10/2018 | Faulkner | H04L 65/1059 |
| 2019/0188459 A1* | 6/2019 | Ahn | G06F 3/04817 |
| 2019/0199963 A1 | 6/2019 | Ahn et al. | |
| 2019/0208165 A1* | 7/2019 | Ahn | H04N 7/147 |
| 2022/0092110 A1* | 3/2022 | Vankipuram | H04N 21/4394 |
| 2022/0100990 A1* | 3/2022 | Jain | H04N 7/15 |
| 2022/0353220 A1* | 11/2022 | Balaji | H04L 12/1831 |

FOREIGN PATENT DOCUMENTS

| | | |
|---|---|---|
| KR | 10-2009-0103211 | 10/2009 |
| KR | 10-2011-0020131 A | 3/2011 |
| KR | 10-1326651 | 11/2013 |
| KR | 10-1480668 | 1/2015 |
| KR | 10-1480669 | 1/2015 |
| KR | 10-2019-0072067 A | 6/2019 |
| KR | 10-2019-0079365 | 7/2019 |

OTHER PUBLICATIONS

Written Opinion of the ISA for PCT/KR2022/007217 dated Aug. 25, 2022, 11 pages.
Extended European Search Report for EP Application No. 22805027.4 dated Sep. 10, 2024, 13 pages.

* cited by examiner

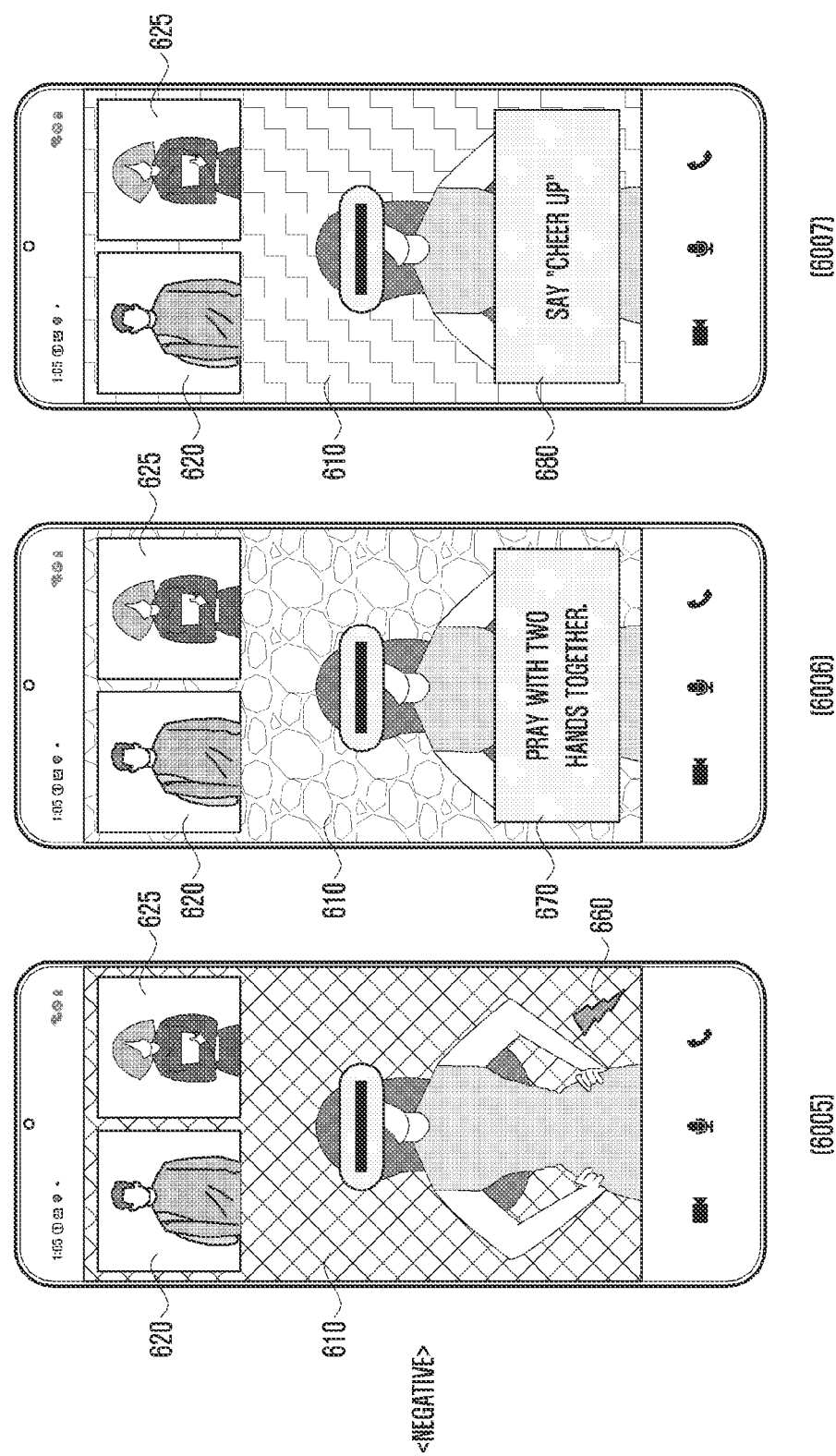

ELECTRONIC DEVICE AND METHOD FOR VIDEO CALL BASED ON REACTION SERVICE

CROSS-REFERENCE TO RELATED APPLICATIONS

This application is a continuation of International Application No. PCT/KR2022/007217 designating the United States, filed on May 20, 2022, in the Korean Intellectual Property Receiving Office and claiming priority to Korean Patent Application No. 10-2021-0065685, filed on May 21, 2021, in the Korean Intellectual Property Office, the disclosures of which are incorporated by reference herein in their entireties.

BACKGROUND

Field

The disclosure relates to an electronic device and a video call method based on a reaction service.

Description of Related Art

An electronic device (for example, portable terminal) provides a voice call, a text call, or a video call service. Efforts to provide a new function during the video call are being made while various contact-free video call platforms are provided for recent non-contact communication (untact communication).

A video call service is a service simultaneously providing an image and a voice between users, and an electronic device may acquire a user image through a camera, acquire a user voice through a microphone, transmit the user voice to a counterpart electronic device, output the image received from the counterpart electronic device on a display, and output the counterpart voice through a speaker during a video call.

However, in non-contact communication such as a video call, it is difficult to detect a counterpart's emotion compared to a contact environment. In addition, there may be a limit in expressing interest in or reaction to a counterpart or conversation.

SUMMARY

Embodiments of the disclosure provide an electronic device and method in which it is possible to analyze emotion corresponding to an utterance of a speaker to induce a customized reaction according to user emotion and provide a reaction service of transmitting an effect therefor to an electronic device of the speaker in a video call.

According to various example embodiments a electronic device may include: a communication module comprising communication circuitry, a camera, a display, and a processor, wherein the processor is configured to control the electronic device to: make a video call connection with at least one counterpart device through the communication module, analyze user emotion, based on a user face recognized in an image acquired from the camera in response to an utterance of a speaker of the at least one counterpart device, and display a reaction induction object inducing a suitable reaction based on user emotion varying in response to the utterance of the speaker on the display.

According to various example embodiments an electronic device may include: a communication module comprising communication circuitry, a microphone, a camera, a display, and a processor, wherein the processor is configured to control the electronic device to: receive a voice of a speaker from the microphone during a video call, control the electronic device to transmit a voice signal of the speaker to a counterpart device through the communication module, receive at least one piece of reaction information corresponding to a reaction input of a counterpart from the counterpart device while the voice of the speaker is received from the microphone, and display a reaction object on the display based on the at least one piece of reaction information.

According to various example embodiments a method of making a video call based on a reaction service by an electronic device is provided, the method may include: making a video call connection with at least one counterpart device by the electronic device, analyzing user emotion, based on a user face recognized in an image acquired from a camera in response to an utterance of a speaker in the at least one counterpart device during the video call, displaying a reaction induction object inducing a suitable reaction based on user emotion varying depending on the utterance of the speaker on a video call screen, receiving a reaction input of reacting to the reaction induction object displayed on the video call screen, and transmitting reaction information corresponding to the received reaction input to a counterpart device of the speaker.

According to various example embodiments a method of making a video call based on a reaction service by an electronic device is provided, the method may include: making a video call connection with at least one counterpart device by the electronic device, receiving a user voice signal from a microphone and transmitting the user voice signal to the counterpart device during the video call, receiving at least one piece of reaction information corresponding to a reaction input of a counterpart from the counterpart device while a voice of a speaker is received from the microphone and displaying a reaction object on a display based on the at least one piece of reaction information.

According to various example embodiments, it is possible to induce a user reaction and response by analyzing user emotion corresponding to an utterance of a speaker and providing a customized reaction induction object suitable for the user emotion in a video call.

According to various example embodiments, as reaction information corresponding to an utterance of a speaker is transmitted to an electronic device of the speaker in a video call, the speaker can identify a reaction of a counterpart or a listener so as to experience the effect or atmosphere of the scene like in fact-to-face communication.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 6A, 6B and 6C are diagrams illustrating example screens displaying visual information corresponding to user emotion according to various embodiments;

DETAILED DESCRIPTION

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

Figure 1:
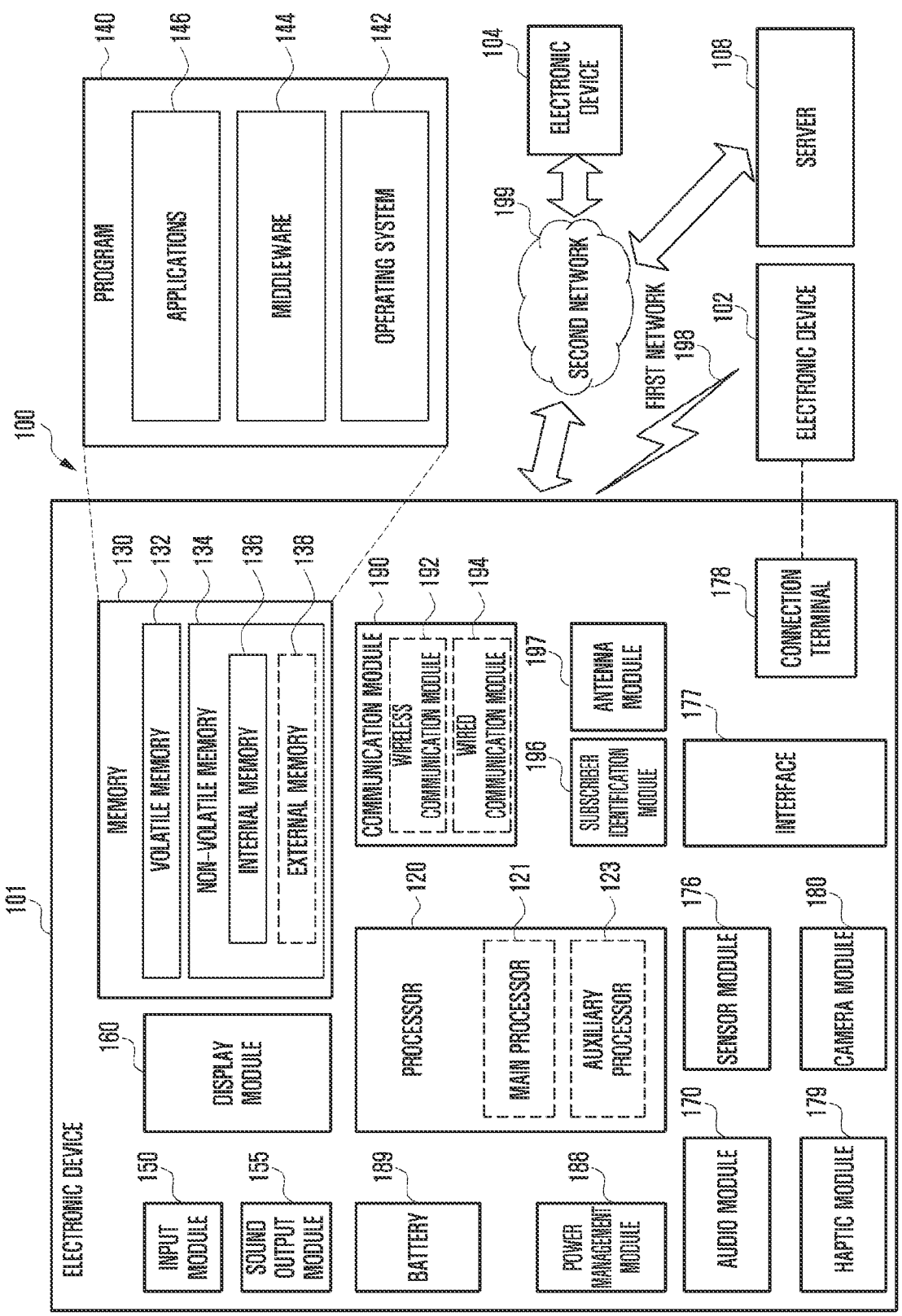
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to various embodiments, the processor 120 may be configured to perform operations defined by the instructions stored in the memory 130. The operations of the processor 120 described below may be performed by loading instructions stored in the memory 130. The operations of the processor 120 are described in greater detail below.

According to an embodiment, the processor 120 may perform control (e.g., control the electronic device) to recognize a user face in an image acquired from a camera in response to an utterance of a speaker in at least one counterpart device in a video call, display a reaction induction object inducing a suitable reaction according to user emotion on a display by analyzing user (for example, listener) emotion in the recognized face, and transmitting reaction information to an electronic device of the speaker in response to reception of a reaction input.

According to an embodiment, the processor 120 may perform control to receive a voice of the speaker from the microphone during a video call, transmit the voice of the speaker to the counterpart device, receive at least one piece of reaction information corresponding to the reaction input of the counterpart from the counterpart device while the voice of the speaker is received from the microphone, and display a reaction object related to the counterpart (for example, listeners) on the display based on the at least one piece of reaction information.

According to various example embodiments, the electronic device may include: a communication module comprising communication circuitry, a camera (for example, the camera module 180), a display (for example, the display module 160), and a processor, and the processor may be configured to control the electronic device to: make a video call connection with at least one counterpart device through the communication module, analyze user emotion based on a user face recognized in an image acquired from the camera in response to an utterance of a speaker in the at least one counterpart device, display a reaction induction object inducing a suitable reaction based on user emotion varying depending on the utterance of the speaker on the display.

According to various example embodiments, the processor 120 may be configured to control the electronic device to: receive a reaction input of reacting to the reaction induction object displayed on the display and transmit reaction information corresponding to the received reaction input to the counterpart device of the speaker.

According to various example embodiments, the processor may be configured to: classify a user emotion type analyzed based on a change in the user face and control the electronic device to display a visual emotion object corresponding to the classified emotion on a video call screen of the user, wherein the emotion type may include a positive type, a neutral type, and a negative type.

According to various example embodiments, the processor may control the electronic device to: display a visual emotion object indicating a positive effect in response to the user emotion belonging to the positive type, display a visual emotion object indicating a neutral effect in response to the user emotion belonging to the neutral type, and display a visual emotion object indicating a negative effect in response to the user emotion belonging to the negative type.

According to various example embodiments, the visual emotion object may be expressed by at least one of a background color of a user video call screen, an emoticon, a background effect, a character, and text.

According to various example embodiments, the processor may be configured to control the electronic device to randomly select and display the visual emotion object among visual emotion objects classified into the emotion types.

According to various example embodiments, the processor may be configured to analyze user emotion in every set period and average the analyzed user emotions to classify the emotion types.

According to various example embodiments, the reaction induction object may include at least one of a selection reaction object inducing selection of good or bad, a behavior reaction of the user corresponding to the user emotion type, or a notification object guiding an indication of a user reaction voice.

According to various example embodiments, the processor may be configured control the electronic device to: randomly select and display a predetermined object among reaction induction objects generated in various schemes for each emotion mode.

According to various example embodiments, the camera may be configured as a separate device independent from the electronic device, and the camera and the electronic device may be implemented to be connected through wireless communication or wired communication.

According to various example embodiments, the electronic device may include: a communication module comprising communication circuitry, a microphone (for example, the input module 150), a camera (for example, the camera module 180), a display (for example, the display module 160), and a processor, wherein the processor may be configured to control the electronic device to: receive a voice of a speaker from the microphone in a video call, transmit a voice signal of the speaker to a counterpart device through the communication module, receive at least one piece of reaction information corresponding to a reaction input of a counterpart from the counterpart device while the voice of the speaker is received from the microphone, and display a reaction object on the display based on the at least one piece of reaction information.

According to various example embodiments, the processor may be configured to: ignore reaction information corresponding to a negative type among the reaction information transmitted from the counterpart device, generate the reaction object based on reaction information corresponding to a positive type, and control the electronic device to display the generated reaction object.

According to various example embodiments, the electronic device may further include a speaker, and the processor may be configured to control the electronic device to output a reaction effect corresponding to the reaction object through the speaker.

According to various example embodiments, the processor may be configured to identify the counterpart device transmitting the reaction information and control the electronic device to generate and display a reaction object including identification information of the counterpart device.

According to various example embodiments, the processor may be configured to record a number of accumulations in response to reception of a plurality of pieces of reaction information of the positive type and control the electronic device to generate and display a reaction object including the number of accumulations.

According to various example embodiments, the processor may be configured to analyze the reaction information transmitted from the counterpart device based on the video call ending, and provide a menu for providing reaction data or a timeline of a counterpart's emotion to a video call end screen.

Figure 2:
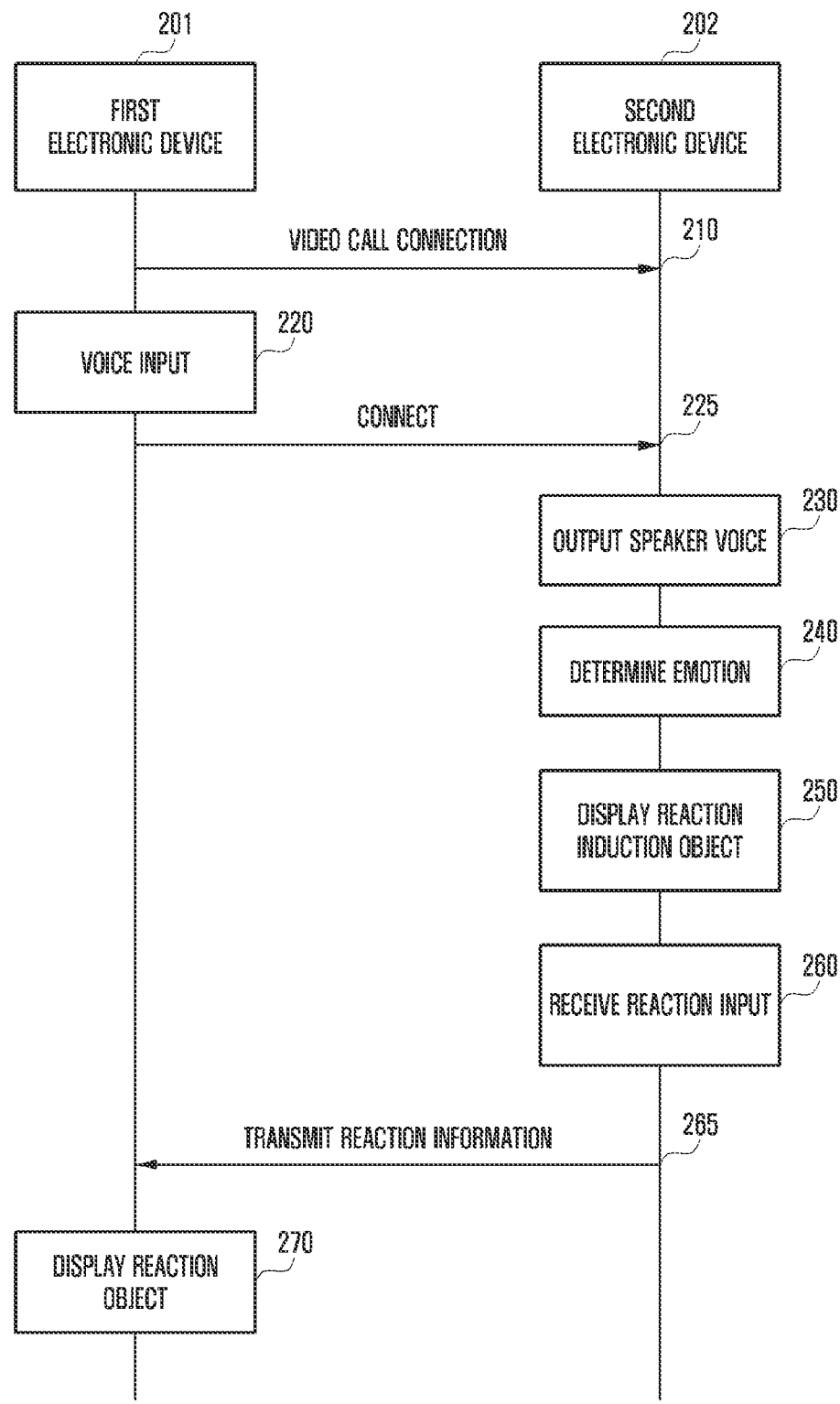
FIG. 2 is a signal flow diagram illustrating an example video call method based on a reaction server between electronic devices according to various embodiments.

FIG. 2 is a signal flow diagram illustrating an example video call method based on a reaction server between electronic devices according to various embodiments.

Referring to FIG. 2, according to an embodiment, a first electronic device 201 (for example, speaker device) and a second electronic device 202 (for example, listener device) may make a video call connection in operation 210. The first electronic device 201 and the second electronic device 202 may include at least some of the elements and/or functions of the electronic device 101 of FIG. 1.

For example, the first electronic device 201 may receive a call (or video call) connection request from the second electronic device 202, establish a call connection session between the first electronic device 201 and the second electronic device 202 in response thereto, and transmit/receive at least one of voice data and image data through the call connection session. In another example, the first electronic device 201 may make a request for a call connection (or video call) to the second electronic device 202 and establish a call connection session between the first electronic device 201 and the second electronic device 202 in response to a response signal of the second electronic device 202.

For example, although FIG. 2 illustrates that the first electronic device 201 and the second electronic device 202 have the call connection therebetween, a third electronic device and an $N^{th}$ electronic device other than the first electronic device 201 and the second electronic device 202 may be connected to make a multi-user video call according to various embodiments.

Each of the first electronic device 201 and the second electronic device 202 may activate a camera and a microphone in response to the connection of the video call and display a video call screen on the display. For example, the first electronic device 201 may collect first image data from the camera, collect first voice data from the microphone, and transmit the first image data and the first voice data to the second electronic device. The second electronic device 202 may collect second image data from the camera, collect second voice data from the microphone, and transmit the second image data and the second voice data to the first electronic device 201.

Hereinafter, it is assumed that the user of the first electronic device 201 makes a voice utterance. For example, although FIG. 2 illustrates that the first electronic device 201 is a speaker device and the second electronic device 202 is a listener device, the second electronic device 202 may operate as the speaker device and the first electronic device 201 may operate as the listener device when the user of the second electronic device 202 makes an utterance.

In operation 220, the first electronic device 201 (for example, the speaker device) may receive a user's voice input from the microphone.

In operation 225, the first electronic device 201 (for example, the speaker device) may transmit an acquired voice signal to the second electronic device 202 (for example, the listener device).

In operation 230, the second electronic device 202 (for example, the listener device) may output a voice signal (in other words, a speaker's voice signal) received from the first electronic device 201 (in other words, a counterpart device) through the speaker during the call connection.

For example, when the voice signal is received through a communication module (or an audio output path is output through the communication module), the second electronic device 202 (for example, the listener device) may determine that the voice from the counterpart device (for example, the first electronic device) is output.

In operation 240, the second electronic device 202 (for example, the listener device) may recognize a user face in the camera image and analyze user (or listener or audience) feeling in response to reception of the speaker voice from the counterpart device (in other words, the first electronic device 201) to determine an emotion.

According to an embodiment, the second electronic device 202 (for example, the listener device) may recognize the user face in the camera image. For example, the second electronic device 202 may detect outline (for example, edge) of a face area in the camera image and separate the background area and the face area (or face contour area) (or extract the face area from the background area). The second electronic device 202 may acquire coordinates of feature points (for example, eyes, nose, and mouth) within the face area based, for example, on differential data between camera image frames.

According to an embodiment, the second electronic device 202 may track changes in face feature points (for example, face (muscle) movement, eye movement, or mouth movement) and estimate or determine user emotion information on the basis of the change in the face area.

When the estimated emotion value calculated in consideration of the change in the face feature points through an emotion extraction program is within a specified emotion range, the second electronic device 202 may determine that emotion of the corresponding range is detected.

The user emotion information may, for example, and without limitation, include at least one of happiness, joy, pleasure, anger, worry, sorrow, boredom, hatred, calmness (peace), fury, contempt, fear, deadpan expression, surprise, or the like.

According to an embodiment, the second electronic device 202 may determine the user emotion by analyzing the user face in every set period while the speaker voice (in other words, counterpart voice received from the first electronic device) is received. The second electronic device 202 may record a change in the user emotion corresponding to the speaker voice.

According to various embodiments, the second electronic device may determine the user emotion based, for example, on a user gesture or a behavior pattern in addition to the face change.

In operation 250, the second electronic device 202 may display a reaction induction object for inducing a customized reaction corresponding to the user (for example, listener or audience) emotion on the display.

According to an embodiment, the second electronic device 202 may calculate an emotion average value according to the user emotion and classify an emotion type based, for example, on the emotion average value. The emotion type may be classified into at least one of a positive type, a neutral type, and a negative type. The second electronic device 202 may display a reaction induction object for inducing a customized reaction on the display in accordance with the classified emotion type.

According to an embodiment, the second electronic device 202 may select and display one of a plurality of reaction induction objects designated for each emotion type.

For example, the reaction induction object may include one of a selection reaction object inducing selection of good or bad or a notification object guiding an indication of a user behavior reaction or a user reaction voice in accordance with the determined emotion.

According to various embodiments, the second electronic device 202 may generate a reaction induction object for inducing a reaction corresponding to the determined emotion and provide the generated reaction induction object to the display. For example, a customized reaction induction object suitable for positive emotion may be generated in response to the positive type of the user (for example, listener) emotion and the generated reaction induction object may be displayed on a video call screen.

According to various embodiments, the second electronic device 202 may display a visual emotion object corresponding to the analyzed user emotion type on the video call screen. The visual emotion object may include at least one of a background color, a background image, an emoticon, an image effect, a sticker, or text. For example, when visual information of the positive type is configured as a blue (or pastel tone) background image, visual information of the negative type may be configured as a red (or vivid tone) background image and visual information of the neutral type may be configured as a gray background image.

The second electronic device 202 may receive a reaction input in operation 260 and may transfer reaction information corresponding to the reaction input to the first electronic device 201 in operation 265.

The reaction input may, for example, be at least one of a reaction selection input, a behavior input, or a voice input.

The user (in other words, the listener or the audience) of the second electronic device 202 may feel his/her own feeling based, for example, on visual emotion elements displayed on the screen and show a reaction which the user desires in accordance with a speaker utterance according to the reaction induction object.

For example, the user may feel that the speaker utterance is good during the video call. The second electronic device 202 may recognize whether the user emotion is good, classify whether the good emotion is positive type emotion, and provide the customized reaction induction object corresponding to the positive type emotion (for example, Press like. Clap or say cheer up.) to the video call screen. The user may conduct a clapping behavior on the basis of the reaction induction object (for example, Clap) displayed on the video call screen. The second electronic device 202 may recognize the clapping behavior as a reaction input and transmit reaction information of the clapping behavior to the first electronic device 201.

In operation 270, the first electronic device 201 may output a reaction effect to the video call screen based on the reaction information transmitted from the second electronic device 202. The reaction effect may include, for example, a visual effect or an auditory effect.

For example, when the first electronic device 201 receives reaction information of the clapping behavior from the second electronic device, the first electronic device may output an effect of giving a big hand through the speaker or display text indicating clapping from the second electronic device on the video call screen.

Figure 3:
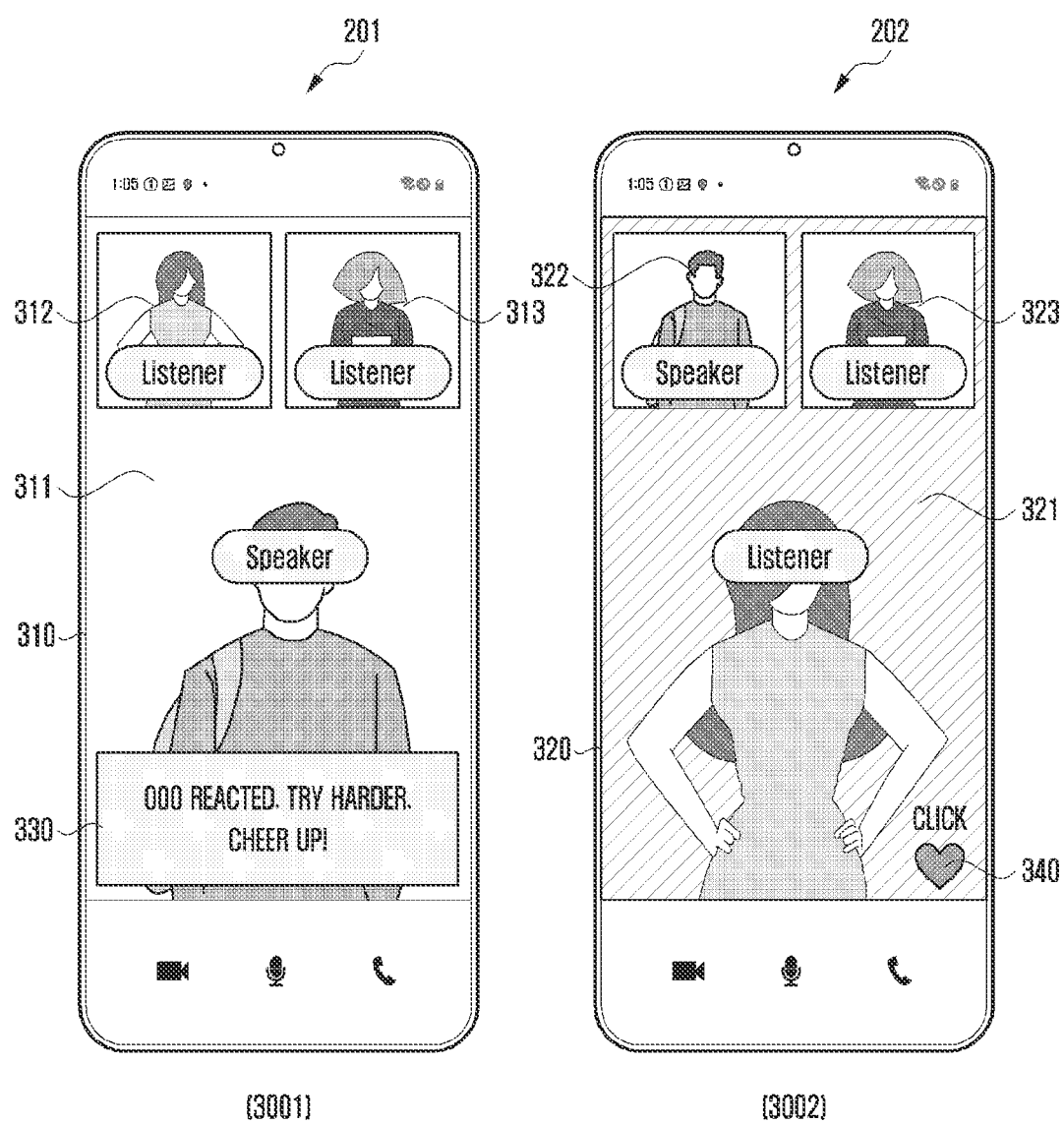
FIG. 3 is a diagram illustrating example video call screens based on a reaction service between electronic devices according to various embodiments.

FIG. 3 is a diagram illustrating example video call screens based on a reaction service between electronic devices according to various embodiments.

Referring to FIG. 3, according to an embodiment, the electronic device 101 (e.g., 201, 202) may display the video call screen on the display in response to the video call connection. The video call screen may be configured in various forms according to frame ratios of images collected for the video call screen (in other words, images collected by the camera and images received from at least one counterpart device) and location information.

Hereinafter, for convenience of description, a speaker device and a listener device will be separately described in connection with a multi-user video call service.

As the speaker device, a first electronic device (for example, the first electronic device 201 of FIG. 2) may display a first video call user interface (UI) screen 310 on the display as indicated by reference numeral 3001.

For example, in the case of a three-party video call, the first video call UI screen 310 may include a user display area 311, a first counterpart display area 312, and a second counterpart display area 313. Although not illustrated, the first video call UI screen 310 may include a function menu (for example, an item for switching to a normal call, a muting item, and an end item) related to the video call.

It is illustrated that the user display area 311 is located on the lower side and the counterpart display areas 312 and 313 are located on the upper side in the first video call UI screen 310, the disclosure is not limited thereto. Locations of the user display area 311, the first counterpart display area 312, and the second counterpart display area 313 may switch according to a user input. For example, when the user selects (for example, touch or drag downward after the touch) the user display area 311 in the state in which the first counterpart display area 312 is located on the lower side and the second counterpart display area 313 and the user display area 311 are located on the upper side, the first electronic device 201 may switch the location of the counterpart display area and the location of the first counterpart display area 312 displayed on the lower side as indicated by reference numeral 3001.

The first electronic device 201 may provide a reaction object 330 (for example, the counterpart device reacted. Please try harder. Cheer up) to the first video call UI screen 310 based, for example, on reaction information transmitted from counterpart electronic devices (for example, the second electronic device 202) while the user speaks in the video call.

The speaker of the first electronic device 201 may identify a reaction of the counterpart (listener or audience) in real time through the reaction object 330.

As the listener device, a second electronic device (for example, the second electronic device 202 of FIG. 2) may display a second video call user interface (UI) screen 320 on the display as indicated by reference numeral 3002.

The second video call UI screen 320 may include a user display area 321, a first counterpart display area 322, and a second counterpart display area 323. Although not illustrated, the second video call UI screen 312 may include a function menu (for example, an item for switching to a normal call, a muting item, and an end item) related to the video call. Locations of the user display area 321, the first counterpart display area 322, and the second counterpart display area 323 may switch according to a user input.

The second electronic device 201 may detect that the counterpart speaks during the video call. The second electronic device 201 may perform graphic processing (for example, highlight a rectangular frame) such that a counterpart image of the speaker is distinguished from a counterpart image of the user who does not speak in the second video call UI screen 320 on the basis of the user speaking.

The second electronic device 201 may analyze user emotion in response to an utterance of the counterpart in the first counterpart display area 322 and display a customized reaction induction object corresponding to the analyzed user emotion on the second video call UI screen 320. The second electronic device 201 may additionally provide a reaction selection icon 340 based on "like" to the second video call UI screen 320 while the counterpart speaks as indicated by reference numeral 3002.

The user may make a reaction input of selecting the reaction selection icon 340 based on "like" displayed on the second video call UI screen 320.

The second electronic device 201 may provide reaction information indicating that like is selected to the counterpart device (for example, the first electronic device 201) which is speaking in response to the reaction input of selecting the reaction selection icon 340.

The user of the second electronic device 201 may identify the customized reaction induction object displayed on the second video call UI screen 320 according to his/her own emotion. The user may transfer a suitable reaction to the speaker according to the utterance of the speaker in consideration of the customized reaction induction object (for example, the reaction selection icon 340 based on "like").

Figure 4:
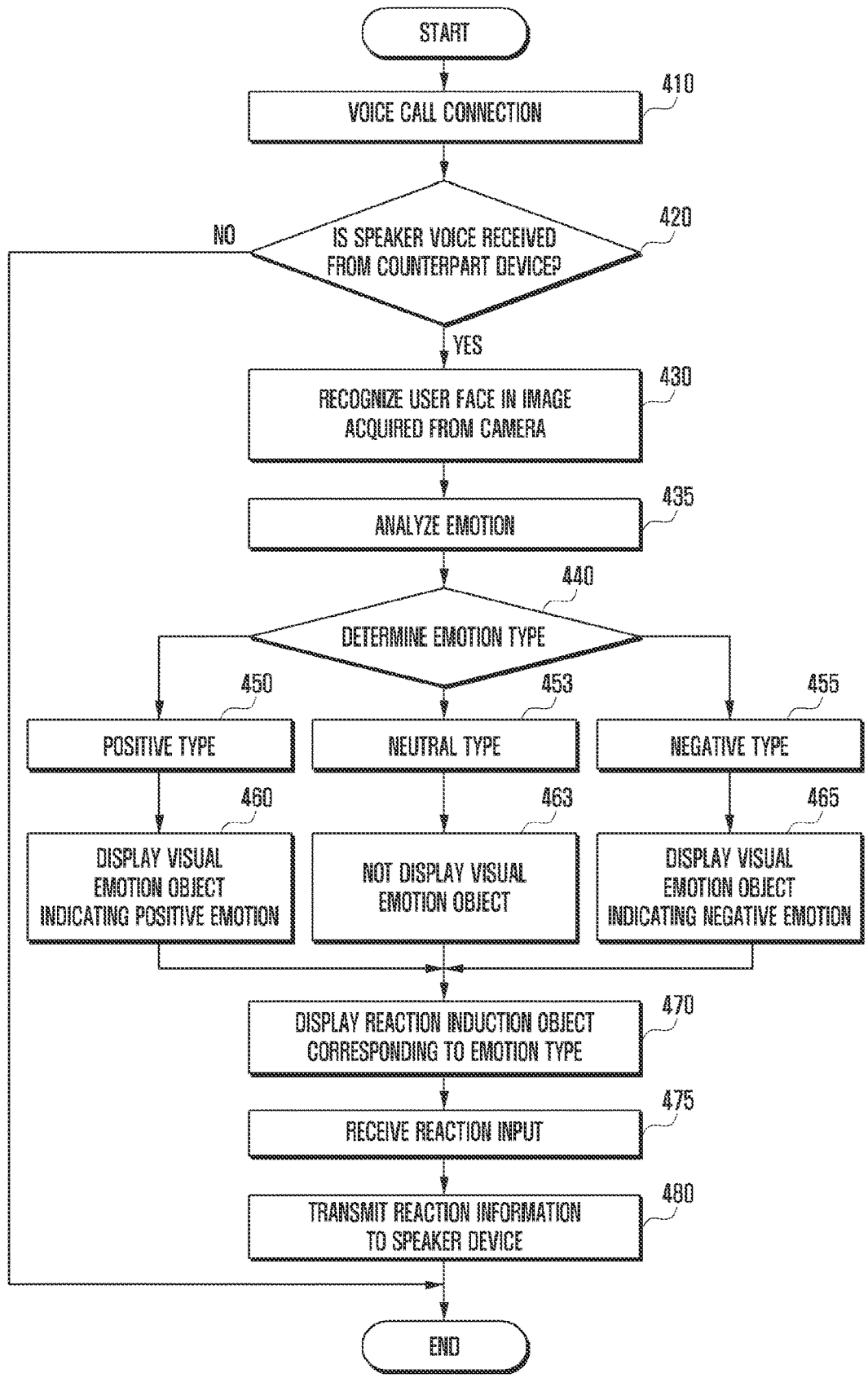
FIG. 4 is a flowchart illustrating an example video call method based on a reaction service of an electronic device according to various embodiments.
Figure 5:
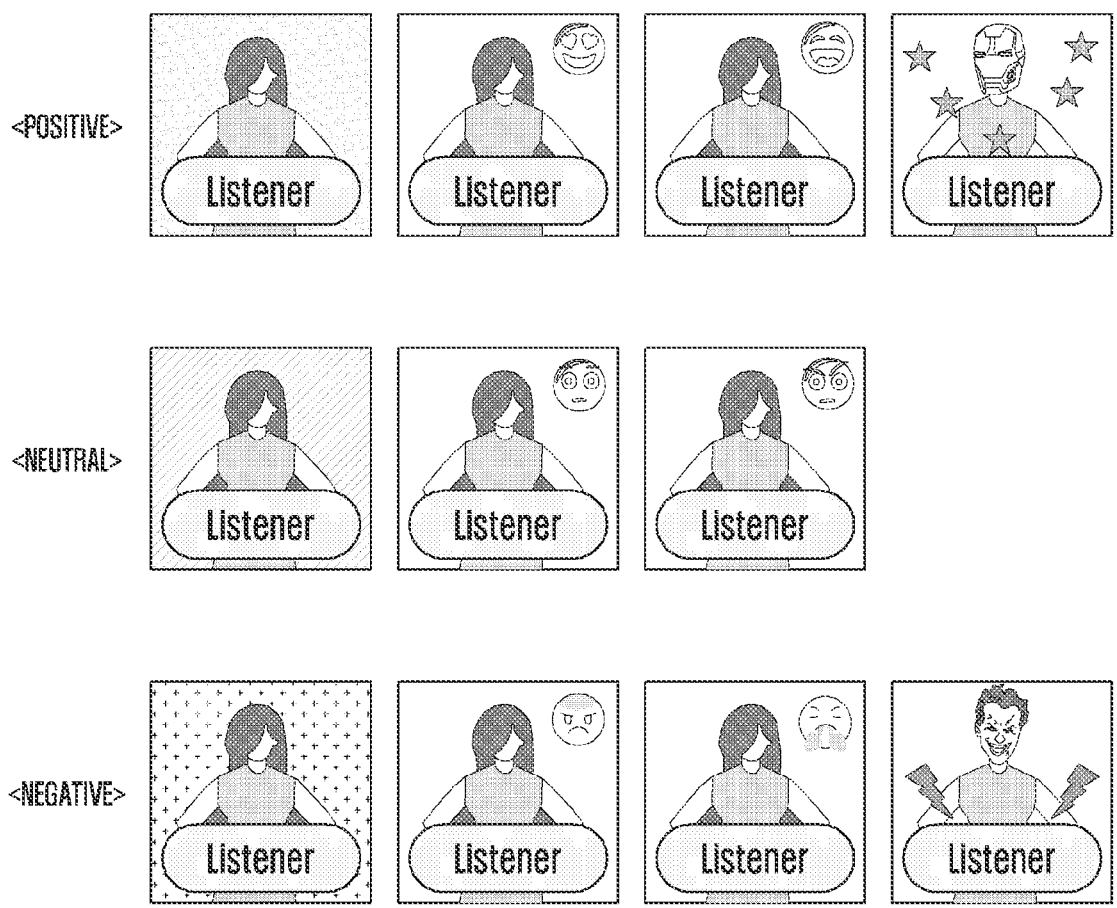
FIG. 5 is a diagram illustrating example visual emotion objects corresponding to user emotion according to various embodiments.

FIG. 4 is a flowchart illustrating an example video call method based on a reaction service of an electronic device according to various embodiments, and FIG. 5 is a diagram illustrating example visual emotion objects corresponding to user emotion. The operation illustrated in FIG. 4 may, for example, be the operation of the listener device.

Referring to FIG. 4, according to an embodiment, a processor (the processor 120 of FIG. 1) of an electronic device (for example, the second electronic device 202 of FIG. 2 or the listener device) may make a video call with at least one counterpart device (for example, speaker device) by controlling a communication module in operation 410.

For example, the electronic device 101 may make a request for a video call connection to the counterpart device or receive the video call connection from the counterpart device. When the electronic device 101 receives a response signal accepting the call connection from the counterpart device or allows the request for connection to the counterpart device, the electronic device may have the video call with the counterpart device.

The electronic device 101 may transmit image data acquired from the camera and voice data acquired from the microphone to the counterpart device in response to the video call connection, display the counterpart image received from the counterpart device on the display, and switch the operation mode to output a counterpart voice to the speaker.

In operation 420, the processor 120 may determine whether a speaker voice is received from the counterpart device. When the processor 120 does not receive the speaker voice from the counterpart device during the video call (No in operation 420), the process of FIG. 4 may end.

In operation 430, the processor 120 may recognize a face in the user image acquired from the camera in response to an utterance of the counterpart (Yes in operation 420).

The processor 120 may detect outline (for example, edge) of a face area in the camera image, separate a background area and the face area (or face contour area), and acquire coordinates of feature points (for example, eyes, nose, and mouth) in the face area on the basis of differential data between camera image frames.

In operation 435, the processor 120 may analyze user emotion based on the recognized user face information. The processor 120 may, for example, track changes in face feature points (for example, face (muscle) movement, eye movement, or mouth movement) and determine (or estimate) user emotion information on the basis of the change in the face area. The user emotion information may include at least one of happiness, joy, pleasure, anger, worry, sorrow, boredom, hatred, calmness (peace), fury, contempt, fear, deadpan expression, or surprise.

For example, when the estimated emotion value calculated in consideration of the change in face feature points of the face is included in the "joy" emotion range through the emotion extraction program, the processor 120 may analyze that the user emotion information is joy information.

In addition, the processor 120 may determine the user emotion on the basis of a user gesture or a behavior pattern as well as the face information.

In operation 440, the processor 120 may classify the user emotion type.

For example, the processor 120 may calculate an emotion average value according to the analyzed user emotion and classify the emotion average value on the basis of the emotion type. The emotion type may be classified into at least one of a positive type, a neutral type, and a negative type. The processor 120 may classify the emotion type based, for example, on a database of emotion information belonging to the positive type, emotion information belonging to the neutral type, and emotion information belonging to the negative type among the various emotions or reference data of emotion classification.

For example, emotion such as happiness, joy, good, delight, pleasure, and satisfaction may be classified as the positive type, emotion such as calmness, lack of emotion, and worry may be classified as the neutral type, and emotion such as anger, sadness, boredom, and fury may be classified as the negative type, which is only an explanation and the disclosure is not limited thereto.

In operation 450, when the analyzed user motion information is the positive type, the processor 120 may display a visual emotion object indicating the positive emotion on the display (for example, the video call screen or the user display area) in operation 460. The visual emotion object may include various types (for example, a background color, a background image, an emoticon, an image effect, a sticker, or text).

For example, the processor 120 may display the visual emotion object classified and pre-manufactured as positive emotion.

In another example, the processor 120 may select visual emotion objects classified as positive emotion from among various contents stored in the electronic device, randomly select one of the selected visual emotion objects of the positive emotion, and display the same on the display. The electronic device 101 may provide various experiences to the user by randomly displaying the visual emotion object.

According to an embodiment, visual emotion objects may be designated for each positive type, each neutral type, or each negative type as illustrated in FIG. 5. Visual emotion objects of the positive type may include visual emotion objects implying the positive effect or positive content such as blue (or pastel tone) background colors, a smile emoticon, a heart sticker, and a hero character. Visual emotion objects of the neutral type may include visual emotion objects implying daily content such as gray background colors, an expressionless face emoticon, and a normal facial expression emoticon, and visual emotion objects of the negative type may include visual emotion objects implying the negative effect or negative content such as red (or vivid tone) background colors, an angry expression emoticon, and a villain character.

When the analyzed user emotion information is the neutral type in operation 453, the processor 120 may not display the visual emotion object on the display (for example, the video call screen or the user display area) in operation 463.

According to some embodiments, the processor 120 may not display the visual emotion object when the analyzed user emotion information is the neutral type, and may display the visual emotion object indicating the neutral emotion on the display when the visual emotion object indicating the neutral emotion exists.

According to some embodiments, when the analyzed user emotion information is the neutral type, the processor 120 may omit the operation of displaying the visual emotion object suitable for the user emotion on the display.

When the analyzed user emotion information is the negative type in operation 455, the processor 120 may display the visual emotion object indicating the negative emotion on the display (for example, the video call screen or the user display area) in operation 465.

For example, the processor 120 may randomly select visual emotion objects (for example, see FIG. 5) classified as the negative emotion and display the same on the display.

In operation 470, the processor 120 may display a reaction induction object for inducing a customized reaction corresponding to user (for example, listener or audience) emotion on the display (for example, the video call screen or the user display area).

The reaction induction object may include, for example, at least one of a selection reaction object inducing selection of good or bad and a notification object guiding an indication of a user behavior reaction or a user voice reaction in accordance with the determined emotion.

According to an embodiment, the processor 120 may select one of a plurality of reaction induction objects designated for each emotion type and display the same on the display.

According to an embodiment, the processor 120 may generate a reaction induction object for inducing a reaction corresponding to the emotion determined through a reaction induction object program and display the generated reaction induction object on the display. For example, when the user emotion is classified as the positive emotion, the processor 120 may generate one of the reaction induction objects such as a section object inducing selection of "like", a notification object inducing a behavior like "Please clap", and a notification object inducing a voice input of saying "the best" and display the same on the display. The reaction induction object may be randomly generated according to a preset rule.

In operation 475, the processor 120 may receive a reaction input corresponding to a user intent.

For example, in the state in which the notification object inducing the behavior like "Please clap" is displayed on the display, a clapping sound may be input through the speaker or the processor 120 may recognize the clapping behavior as the reaction input through the camera image.

In operation 480, the processor 120 may transmit reaction information based on the reaction input to the speaker device.

For example, the processor 120 may transmit reaction information for the clapping behavior to the counterpart device which speaks in the current video call.

Although not illustrated, the processor 120 may repeatedly perform operation 440 to operation 480 by analyzing user emotion in every configured period while the counterpart is speaking (in other words, a counterpart voice is received from the first electronic device).

Figure 6A:
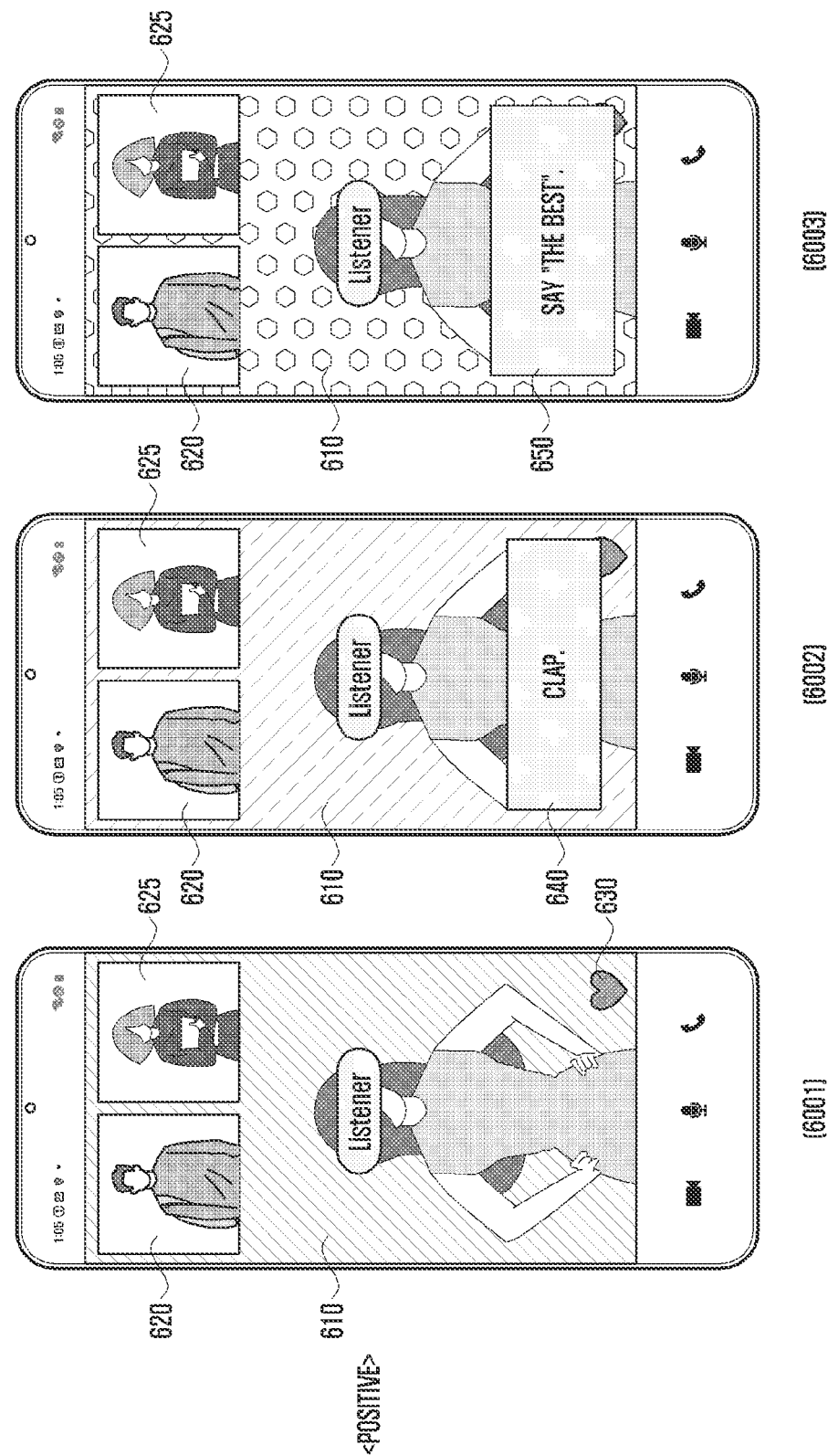
Figure 6B:
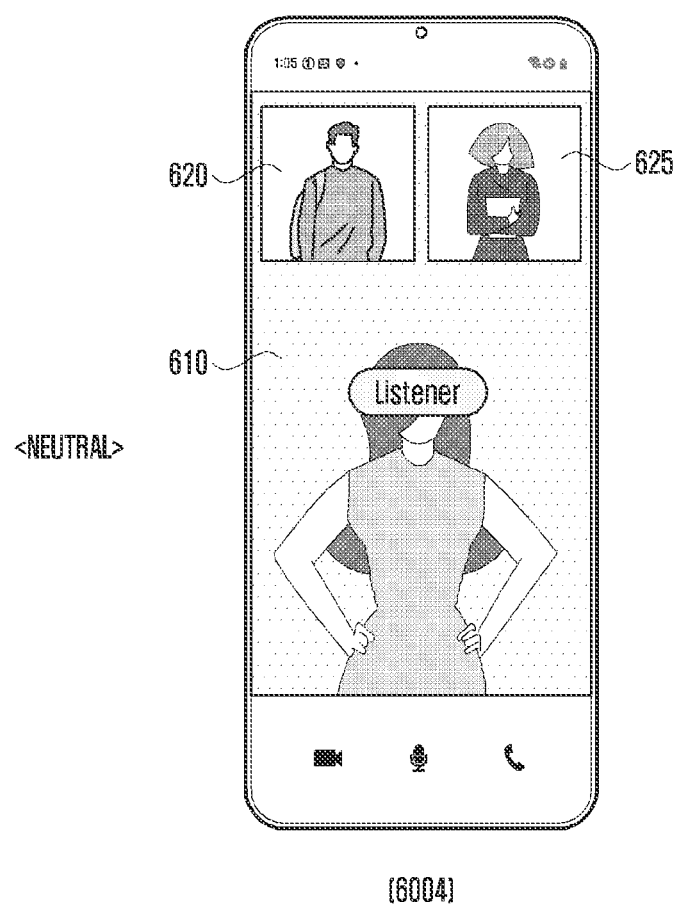

FIGS. 6A, 6B and 6C are diagrams illustrating example screens displaying visual information corresponding to user emotion according to various embodiments.

Referring to FIGS. 6A, 6B and 6C, according to various embodiments, the electronic device 101 may support randomly displaying of a reaction induction object in various schemes for each emotion type.

For example, the electronic device 101 may display a video call screen including a user display area 610, a first counterpart display area 620, and a second counterpart display area 625 on the display during a three-party video call. For example, it is assumed that the user of the first counterpart display area 620 speaks.

For example, the electronic device 101 of the listener may display a selection object 630 inducing selection of "like" in the user display area 610 as indicated by reference numeral 6001 in response to classification of user emotion as positive emotion while the counterpart speaks. The electronic device 101 may select the like selection object and transmit information on the reaction of selecting "like" (or like reaction) to the electronic device of the speaker in response to the user reaction input.

In another example, the electronic device 101 may display a notification object 640 inducing a behavior like "Please clap" or "Clap" in the user display area 610 of the video call screen as indicated by reference numeral 6002 in response to classification of user emotion as positive emotion while the counterpart speaks. The user may conduct the clapping behavior by identifying the notification object and the electronic device 101 may recognize the same as a reaction input.

In another example, the electronic device 101 may display a notification object 650 inducing a voice input of saying "the best" in the user display area 610 of the video call screen as indicated by reference numeral 6003 in response to classification of user emotion as positive emotion while the counterpart speaks. The user may say the best by identifying the notification object and the electronic device 101 may recognize the same as a reaction input.

Meanwhile, when the user emotion is classified as neutral emotion while the counterpart speaks, the reaction induction object may not be displayed as indicated by reference numeral 6004.

Meanwhile, the electronic device 101 of the listener may display a selection object 660 inducing selection of "dislike" in the user display area 610 of the video call screen as indicated by reference numeral 6005 in response to classification of user emotion as negative emotion while the counterpart speaks.

In another example, the electronic device 101 may display a notification object 670 inducing a behavior like "Pray with two hands together" in the user display area 610 of the video call screen as indicated by reference numeral 6006 in response to classification of user emotion as negative emotion while the counterpart speaks. In another example, the electronic device 101 may display a notification object 680 inducing a voice input of saying "Cheer up" in the user display area 610 of the video call screen as indicated by reference numeral 6007 in response to classification of user emotion as negative emotion while the counterpart speaks. When the user desires to react with negative emotion in response to the utterance of the speaker, the user may transmit reaction information of negative emotion to the electronic device of the speaker through the reaction induction object.

Figure 7:
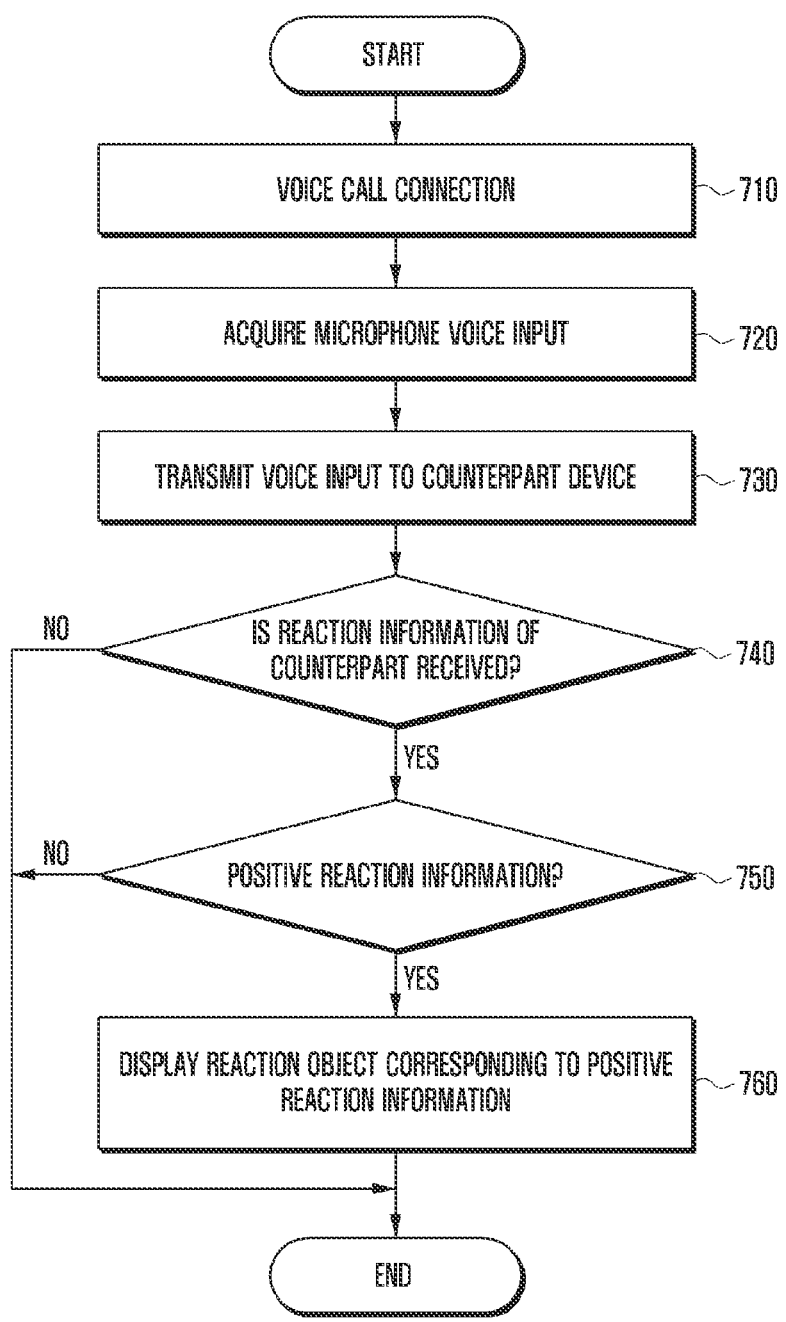
FIG. 7 is a flowchart illustrating an example video call method based on a reaction service of an electronic device according to various embodiments.

FIG. 7 is a flowchart illustrating an example video call method based on a reaction service of an electronic device according to various embodiments. The operation illustrated in FIG. 7 may be the operation of the speaker device.

Referring to FIG. 7, according to an embodiment, a processor (the processor 120 of FIG. 1) of an electronic device (for example, the first electronic device 202 (speaker device) of FIG. 2) may make a video call to at least one counterpart device (for example, the listener device) by controlling a communication module in operation 710.

The electronic device 101 may transmit image data acquired from the camera and voice data acquired from the microphone to the counterpart device in response to the video call connection, display the counterpart image received from the counterpart device on the display, and switch the operation mode to output a counterpart voice to the speaker.

In operation 720, the processor 120 may acquire a voice input from the microphone.

In operation 730, the processor 120 may transmit an utterance (e.g., voice) input to be acquired to the counterpart device.

In operation 740, the processor 120 may determine whether reaction information is received from the counterpart device while the user speaks through the microphone. When no reaction information is received from the counterpart device during the video call connection (No in operation 740), the processor 120 may end the process of FIG. 7.

In operation 750 (Yes in operation 740), the processor 120 may determine whether the reaction information transmitted from the counterpart is a positive type.

According to an embodiment, the processor 120 may receive reaction information of the positive type or reaction information of the negative type from the counterpart and identify whether the counterpart reaction is the positive type or the negative type on the basis of the reaction information. When the reaction information transmitted from the counterpart is the negative type (No in operation 750), the processor 120 may end the process of FIG. 7.

In operation 760 (Yes in operation 750), the processor 120 may display a reaction object corresponding to a positive reaction on the display (for example, the video call screen or the user display area) in response to reception of the reaction information of the positive type. For example, the processor 120 may generate a reaction object indicating that the counterpart provides a reaction or a positive feedback in response to the user utterance on the basis of the reaction information of the positive type and display the generated reaction object on the display. For example, the reaction object may be generated based, for example, on a configured template. In another example, the reaction object may be generated in various scheme by various conditions such as the number of positive reactions and whether identification information of the counterpart device is included among a plurality of templates.

According to various embodiments, the processor 120 may identify the counterpart device receiving the reaction information of the positive type. The processor 120 may display the reaction object and information indicating the counterpart device providing the reaction of the positive type together on the display.

According to various embodiments, the processor 120 may output a reaction effect according to the reaction object through the speaker. For example, the processor 120 may output a clapping sound through the speaker when reaction information related to the clapping reaction is executed in the counterpart device.

According to various embodiments, in a multi-user video call, the processor 120 may receive a plurality of pieces of reaction information, determine whether the reaction information is a positive or a negative type, and determine whether the reaction information of the positive type exceeds a threshold value. For example, the processor 120 may accumulate the number of receptions of reaction information of the positive type and identify whether the accumulated reaction information of the positive type exceeds a threshold value. The processor 120 may display a reaction object corresponding to positive reaction information on the display (for example, the video call screen or the user display area) in response to the reaction information of the positive type larger than the threshold value.

In the video call, the electronic device 101 may receive counterpart (counterpart device) reaction information in response to the user utterance and provide the reaction object on the display only for the positive reaction, so as to allow the user to experience a good feeling or a positive reaction of the counterpart for the user utterance (or commend or announcement). The electronic device 101 may not transmit a negative reaction to the user and thus may exclude a negative feeling for the user utterance, thereby providing an environment of promoting more comfortable and stable speech.

Figure 8:
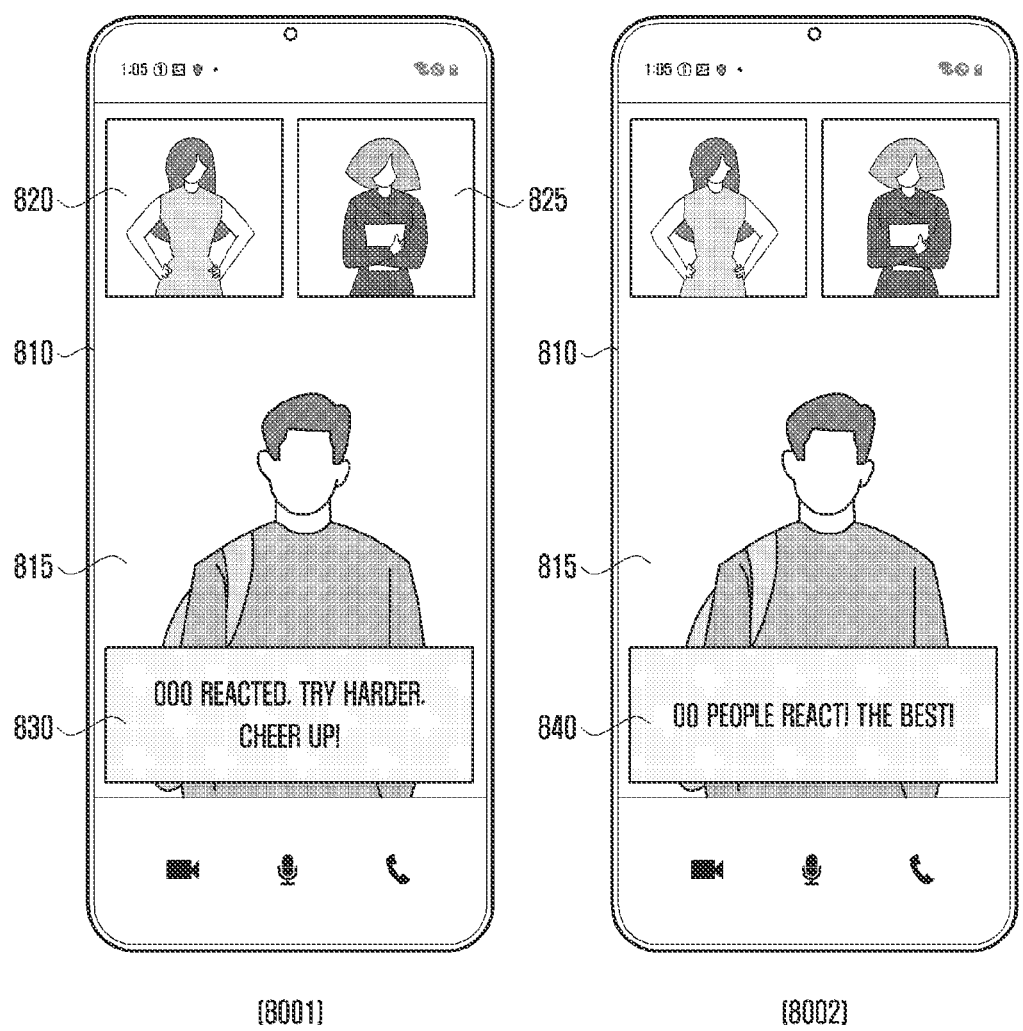
FIG. 8 is a diagram illustrating example screens displaying visual information corresponding user emotion according to various embodiments.

FIG. 8 is a diagram illustrating example screens displaying visual information corresponding user emotion according to various embodiments.

Referring to FIG. 8, according to various embodiments, the electronic device 101 may support displaying of a reaction object in various ways according to the number of accumulations of positive reactions received in response to a user utterance in a video call.

For example, in a three-party video call, the electronic device 101 may display a video call screen 810 including a user (or speaker) display area 815, a first counterpart display area 820, and a second counterpart display area 825 on the display.

According to an embodiment, when reaction information of a positive type is received from one counterpart device having a video call with the electronic device 101 while the user speaks, the electronic device 101 may display a reaction object 830 (for example, "000 reacted. Try harder. Cheer up") including counterpart identification information in the user display area 815 of the video call screen 810 as indicated by reference numeral 8001. The electronic device 101 may identify the counterpart (or counterpart device) providing positive reaction information (for example, a nickname provided when the video call is made or identification information stored in contacts), generate the reaction object 830 including the counterpart information, and display the same on the display.

According to an embodiment, when a plurality of pieces of reaction information of the positive type are received while the user speaks, the electronic device may display a reaction object 840 (for example, "00 people react. The best") including the number of reactions in the user display area of the video call screen as indicated by reference numeral 8002. The electronic device 101 may accumulate and record positive reaction information and reflect the same to generate the reaction object 840.

Figure 9:
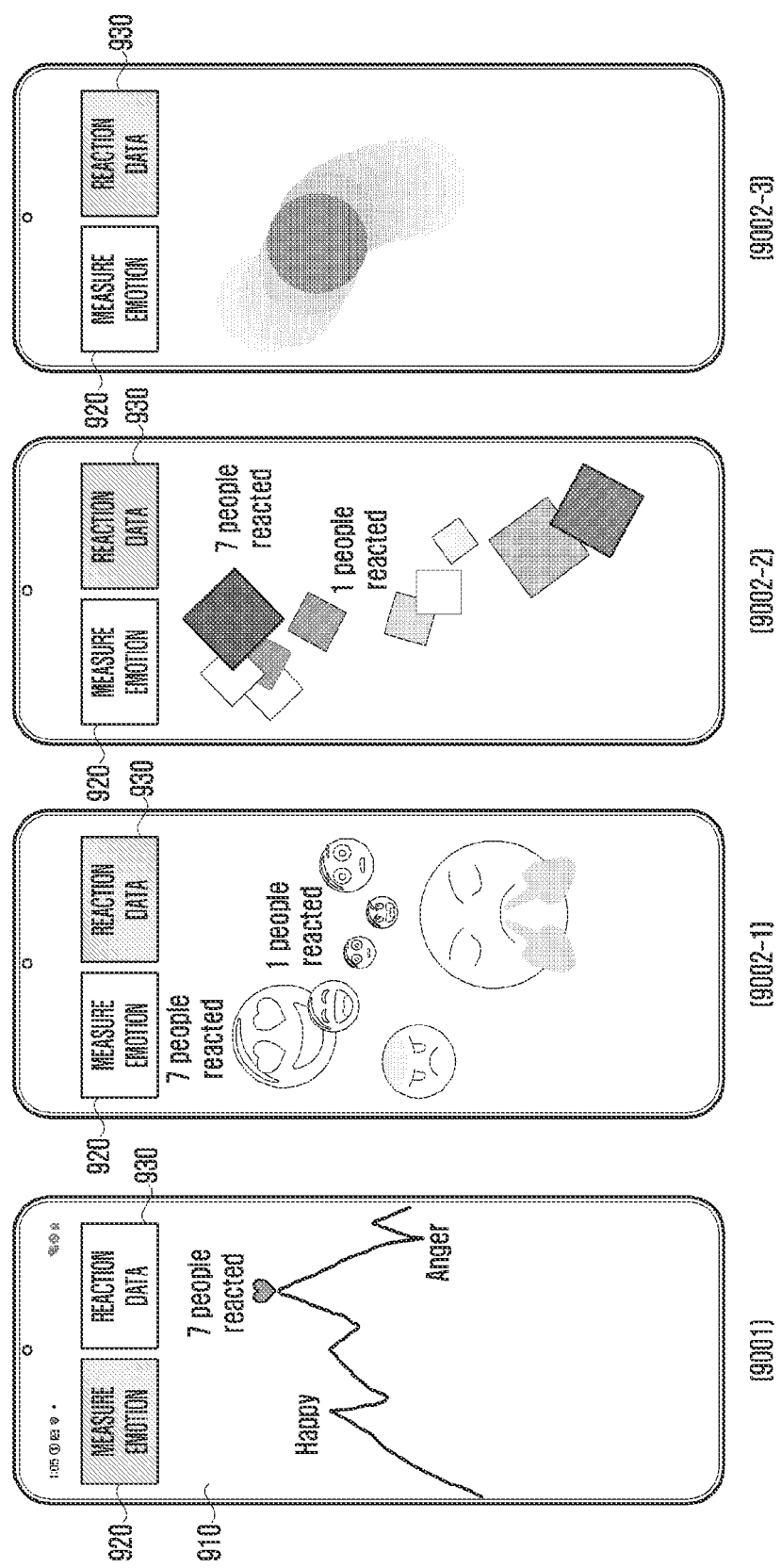
FIG. 9 is a diagram illustrating example screens providing reaction information of an electronic device according to various embodiments.

FIG. 9 is a diagram illustrating example screens providing reaction information of an electronic device according to various embodiments.

Referring to FIG. 9, according to various embodiments, the electronic device 101 may support a function of analyzing reaction information transmitted from the counterpart device and providing a timeline of the reaction data in the video call. For example, reaction information may include emotion information and information related to a reaction input.

When the video call ends, the electronic device 101 may provide a reaction record notification menu (not shown) related to conversation and display a timeline of the reaction data on the display in response to selection of the reaction record notification menu.

According to an embodiment, the electronic device 101 may provide a timeline of emotion information on the screen 910 measured by the counterpart device in response to an input of selecting a first tap item 920 (for example, emotion measurement item) as indicated by reference numeral 9001.

According to an embodiment, the electronic device 101 may provide reaction records in the form of a timeline for visualization in an Emoji graph type in response to an input of selecting a second tap item 930 (for example, reaction data item) as indicated by reference numeral 9002-1. When reaction information is collected as multiple reactions for the negative or positive reaction, the electronic device 101 may express the size to be larger N times per N people than the size of other Emoji objects.

According to an embodiment, the electronic device 101 may provide a timeline visualizing a reaction record in the form of a color card in response to an input of selecting a second tap item 930 (for example, a reaction data item) as indicated by reference numeral 9002-2. In this case, when reaction information is collected as multiple reactions, the electronic device 101 may increase and express the size or chroma per N people.

According to an embodiment, the electronic device 101 may provide a timeline visualizing a reaction record in the circular form in response to an input of selecting a second tap item 930 (for example, a reaction data item) as indicated by reference numeral 9002-3. In this case, the electronic device 101 may separately express chroma according to the number of reaction accumulations for each step.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
  a communication module comprising communication circuitry;
  a camera;
  a display; and
  a processor,
  wherein the processor is configured to control the electronic device to: make a video call connection with at least one counterpart device through the communication module, analyze user emotion based on a user face recognized in an image acquired from the camera in response to an utterance of a speaker of the at least one counterpart device, and display a reaction induction object inducing a suitable reaction based on user emotion varying in response to the utterance of the speaker on the display.

2. The electronic device of claim 1, wherein the processor is configured to control the electronic device to: receive a reaction input of reacting to the reaction induction object displayed on the display and transmit reaction information corresponding to the received reaction input to the counterpart device of the speaker.

3. The electronic device of claim 1, wherein the processor is configured to: classify types of the user emotion analyzed based on a change in the user face and display a visual emotion object corresponding to the classified emotion in a video call screen of the user, the emotion types comprising a positive type, a neutral type, and a negative type.

4. The electronic device of claim 1, wherein the processor is configured to control the electronic device to: display a visual emotion object indicating a positive effect in response to the user emotion belonging to the positive type, not display the visual emotion object or display a visual emotion object indicating a neutral effect in response to the user emotion belonging to the neutral type, and display a visual emotion object indicating a negative effect in response to the user emotion belonging to the negative type.

5. The electronic device of claim 4, wherein the visual emotion object is expressed by at least one of a background color of a user video call screen, an emoticon, a background effect, a character, and text.

6. The electronic device of claim 1, wherein the processor is configured to: to randomly select one of the visual emotion objects classified by the emotion type and display the visual emotion object.

7. The electronic device of claim 3, wherein the processor is configured to: analyze user emotion in every configured period, average the analyzed user emotions, and classify the emotion type.

8. The electronic device of claim 1, wherein the reaction induction object comprises at least one of a selection reaction object inducing selection of good or bad, a user behavior reaction corresponding to the user emotion type, or a notification object guiding an indication of a user reaction voice.

9. The electronic device of claim 1, wherein the processor is configured to: randomly select and control the electronic device to display a specified object from among reaction induction objects generated in various methods for each emotion mode.

10. The electronic device of claim 1, wherein the camera is a separate device independent from the electronic device and the camera is configured to be connected to the electronic device through wireless communication or wired communication.

11. An electronic device comprising:
  a communication module comprising communication circuitry;
  a microphone;
  a camera;
  a display; and
  a processor,
  wherein the processor is configured to control the electronic device to:
  receive a voice of a speaker from the microphone during a video call,
  transmit a voice signal of the speaker to a counterpart device through the communication module,
  receive at least one piece of reaction information corresponding to a reaction input of a counterpart from the counterpart device while the voice of the speaker is received from the microphone,
  identify the counterpart device transmitting the reaction information, and generate and display a reaction object comprising identification information of the counterpart device on the display based on the at least one piece of reaction information.

12. The electronic device of claim 11, wherein the processor is configured to: ignore reaction information corresponding to a negative type among the reaction information transmitted from the counterpart device, generate the reaction object based on reaction information corresponding to a positive type, and control the electronic device to display the generated reaction object.

13. The electronic device of claim 11, further comprising a speaker, wherein the processor is configured to control the electronic device to output a reaction effect corresponding to the reaction object through the speaker.

14. The electronic device of claim 11, wherein the processor is configured to control the electronic device to: record a number of accumulations in response to reception of a plurality of pieces of reaction information of the positive type and generate and display a reaction object comprising the number of accumulations.

15. The electronic device of claim 11, wherein the processor is configured to analyze the reaction information transmitted from the counterpart device based on the video call ending, and provide a menu for providing reaction data or a timeline of a counterpart's emotion to a video call end screen.

16. A method of making a video call based on a reaction service by an electronic device, the method comprising:
    making a video call connection with at least one counterpart device by the electronic device;
    analyzing user emotion, based on a user face recognized in an image acquired from a camera in response to an utterance of a speaker in the at least one counterpart device during the video call;
    displaying a reaction induction object inducing a suitable reaction based on user emotion varying depending on the utterance of the speaker on a video call screen;
    receiving a reaction input of reacting to the reaction induction object displayed on the video call screen; and
    transmitting reaction information corresponding to the received reaction input to a counterpart device of the speaker.

17. The method of claim 16, wherein the reaction induction object comprises at least one of a selection reaction object inducing selection of good or bad, a behavior reaction of a user corresponding to a user emotion type, or a notification object guiding an indication of a user reaction voice.

* * * * *